Sept. 18, 1962   W. EWALD ETAL   3,054,338
DISTANCE PRESELECTOR FOR PHOTOGRAPHIC
OR CINEMATOGRAPHIC OBJECTIVES
Filed July 10, 1959
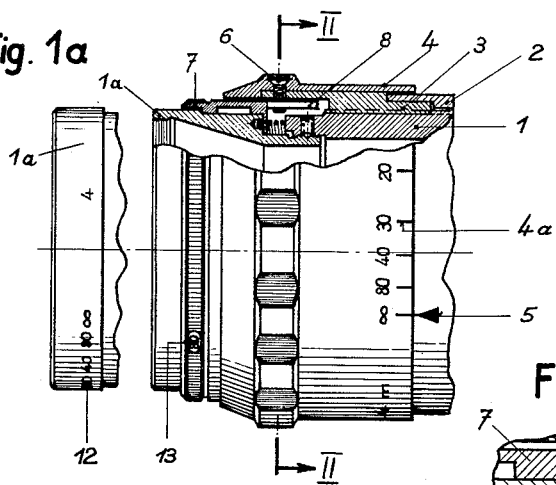
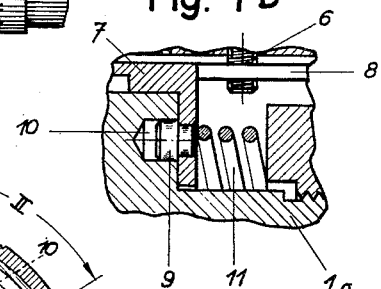
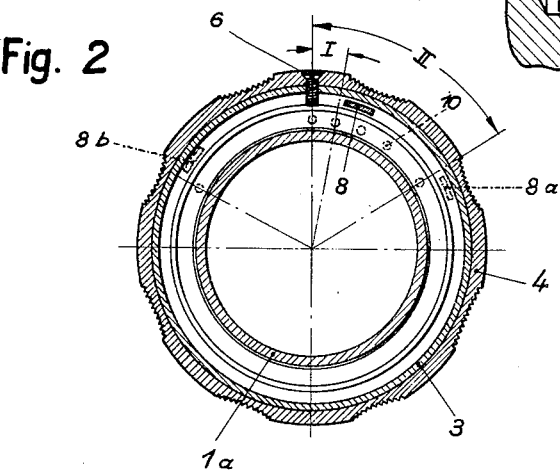
Inventors:
Waldemar EWALD
Karl TESCH
By
Agent 3,054,338
DISTANCE PRESELECTOR FOR PHOTOGRAPHIC OR CINEMATOGRAPHIC OBJECTIVES
Waldemar Ewald and Karl Tesch, Kreuznach, Rhineland, Germany, assignors to Jos. Schneider & Co., Optische Werke, Kreuznach, Rhineland, Germany, a corporation of Germany
Filed July 10, 1959, Ser. No. 826,363
Claims priority, application Germany July 26, 1958
2 Claims. (Cl. 95—45)

Our present invention relates to an optical objective for a photographic or cinematographic camera having means for varying the focal adjustment of such objective.

It is well known in the camera art to provide means in the form of a focusing ring or the like which can be adjusted to vary the setting of an objective between a distal (usually infinity) and a proximal limit. This adjustment is generally carried out with the aid of a suitably calibrated distance scale which the user must observe when changing from one setting to another. The necessity for concentrating on such distance scale is an inconvenience where it is desired to refocus between exposures rapidly following one another, as is frequently the case particularly in motion-picture taking.

It is, therefore, the object of our present invention to provide means enabling the resetting of an optical objective from an initial focusing position to at least one other, preferably adjustable focusing position by touch only, thus without requiring the operator to take his eyes from the scene to be photographed.

In accordance with a feature of this invention we provide, in combination with a conventional focusing ring or equivalent setting member, a control member adjustably positioned on the objective body, the two members having co-operating formations adapted to engage each other in a focusing position determined by the setting of the control member so as to limit the displacement of the focusing member from a starting position. Advantageously, in accordance with another feature of our invention, the control member is a ring adapted to be indexed in a plurality of angular positions which, preferably as read on a separate scale, represent various stop positions for the focusing member to which the control member may be selectively preset.

The above and other objects and features of our invention will become more fully apparent from the following description of a preferred embodiment, reference being made to the accompanying drawing in which:

FIG. 1 is a side-elevational view, partly in section, of an optical system embodying the invention;

FIG. 1a is a fragmentary elevational view of the system of FIG. 1;

FIG. 1b shows a detail of the system of FIG. 1 on a larger scale; and

FIG. 2 is a cross-sectional view taken on the line II—II of FIG. 1.

The drawing shows part of a stationary objective housing 2 having slidably but non-rotatably mounted thereon, in the usual manner, a lens barrel 1 provided with a forward extension 1a. The lens barrel 1, 1a holds a front lens assembly, not shown, which is axially displaceable relatively to a rear lens assembly (also not shown) in objective housing 2. For this purpose there is provided a rotatable focusing ring 3 which threadedly engages the lens barrel 1 and is rigidly secured by a screw 6 to an outer setting ring 4. The latter, held against axial displacement relatively to the stationary housing 2 by suitable means not shown, is provided with a distance scale 4a cooperating with a pointer 5 on an adjacent surface portion of the housing. The arrangement so far described is entirely conventional.

In accordance with our invention we provide on barrel extension 1a a rotatable control ring 7 which partly extends underneath the rotatable focusing member 3, 4 and is provided with a lug 8 engageable by the screw 6 of that member. Control ring 7 has a transverse annular surface carrying a stud 9 which, under the pressure of a coil spring 11 axially bearing on ring 7 as best seen in FIG. 1b, is urged into one of several indexing holes 10 which, as shown in dotted lines in FIG. 2, are peripherally distributed over an adjacent transverse annular shoulder of barrel extension 1a. The forward portion of ring 7 normally overlies an auxiliary distance scale 12 on barrel extension 1a and is provided with a window 13 exposing different markings of that scale in different rotary positions of ring 7 in which the stud 9 engages respective indexing holes 10.

In operation, with the system focused at infinity as illustrated, the user preselects a desired proximal limit by pressing the ring 7 rearwardly (to the right in FIG. 1) against the force of spring 11 and rotating it until a desired marking on selector scale 12 appears in or next to the window 13. At this point, ring 7 is released to allow its stud 9 to snap into the indexing hole 10 aligned therewith. The lug 8 may then occupy the position shown in full lines in FIG. 2, corresponding for example to a distance of 80 meters as shown. If the user now turns the setting ring 4 clockwise (as viewed in FIG. 2) through an angle I, the screw 6 will strike the lug 8 and will arrest the focusing mechanism in a position corresponding to the distance visible through window 13. Similarly, if the control ring 7 has been displaced so as to move lug 8 into the position indicated at 8a in FIG. 2, a range of, say, 20 meters would have been preselected since the ring 4 could then have been turned through an angle II before being arrested by this lug. Another one of the indexing holes 10 defines a lug position 8b in which the ring 4 is freely rotatable over the entire range of scale 4a for normal visual adjustment.

It will be apparent that the system of our invention may also be used for the purpose of preselecting the distal range limit, with suitable modification of the auxiliary scale 12, so that screw 6 strikes the lug 8 after counterclockwise rotation (as viewed in FIG. 2) from a starting position corresponding to a finite focusing distance. Naturally, the scale 12 and/or the window 13 may be duplicated for this purpose to enable preselection of either limit; similarly, the ring 7 may be provided with a second stop (e.g. diametrically opposite lug 8) to this end. These and other modifications will be readily apparent to persons skilled in the art and may be adopted without departing from the spirit and scope of the invention as defined in the appended claims.

We claim:

1. An optical objective comprising a housing, a lens barrel axially displaceable in said housing and held non-rotatably therein, a rotatable setting ring on said housing controlling the displacement of said lens barrel, and range-preselector means including a control ring carried on said lens barrel adjacent said setting ring and selectively adjustable thereon to a plurality of angularly offset positions relative to said housing, said rings being coaxial with said barrel and provided with co-operating formations engaging each other in a selected focusing position upon displacement of said setting ring from another focusing position, said control ring being provided with indexing means adapted selectively to hold it in different angular positions on said lens barrel.

2. An optical objective according to claim 1 wherein said control ring is axially displaceable on said lens barrel and is provided with a transverse annular surface facing a similar surface on said lens barrel, one of said surfaces being provided with a plurality of angularly spaced holes, said indexing means comprising a projection on the other of said surfaces adapted to enter any one of said holes and spring means resisting axial displacement of said control ring while tending to urge said projection into a hole aligned therewith.

References Cited in the file of this patent

UNITED STATES PATENTS

| | | |
|---|---|---|
| 2,469,691 | Lee | May 10, 1949 |
| 2,805,609 | Nerwin | Sept. 10, 1957 |
| 2,863,358 | Czarnikow | Dec. 9, 1958 |
| 2,887,937 | Gebele | May 26, 1959 |
| 2,896,524 | Warzybok et al. | July 28, 1959 |
| 2,938,444 | Kellner | May 31, 1960 |

FOREIGN PATENTS

| | | |
|---|---|---|
| 789,835 | Great Britain | Jan. 29, 1958 |